United States Patent [19]

Yeakley

[11] 4,292,632

[45] Sep. 29, 1981

[54] DISPLACEMENT SENSING DEVICE HAVING CAPACITANCE TRANSDUCTION ELEMENT

[76] Inventor: Lester M. Yeakley, 776 Morgan Dr., Boulder, Colo. 80303

[21] Appl. No.: 937,700

[22] Filed: Aug. 29, 1978

[51] Int. Cl.³ .......................................... G08C 19/10
[52] U.S. Cl. ........................... 340/870.37; 324/61 R
[58] Field of Search ................. 340/200, 177 R, 198, 340/196; 318/662; 324/61 R; 361/287, 289, 239; 323/93

[56] References Cited

U.S. PATENT DOCUMENTS

| | | |
|---|---|---|
| 2,671,892 | 3/1954 | Childs . |
| 3,002,104 | 9/1961 | Mynall . |
| 3,219,920 | 11/1965 | Wall ..................... 340/200 |
| 3,221,256 | 11/1965 | Walden . |
| 3,372,333 | 3/1968 | Esch . |
| 3,487,402 | 12/1969 | Hillhouse . |
| 3,566,221 | 2/1971 | Sargent . |
| 3,566,222 | 2/1971 | Wolfendale et al. . |
| 3,570,003 | 3/1971 | West . |
| 3,641,429 | 2/1972 | Cox et al. ............. 340/195 |
| 3,723,866 | 3/1973 | Michaud et al. ....... 340/200 |
| 3,758,845 | 9/1973 | Mackelvie et al. .... 340/195 |
| 3,760,392 | 9/1973 | Stich .................... 340/200 |
| 3,784,897 | 1/1974 | Norrie .................. 340/200 |
| 3,845,377 | 10/1974 | Shimotori ............. 340/200 |
| 3,873,916 | 3/1975 | Sterki .................. 340/200 |
| 3,928,796 | 12/1975 | Kaiser ................. 324/61 R |
| 3,938,113 | 2/1976 | Dobson et al. ........ 340/200 |
| 3,961,318 | 6/1976 | Farrand et al. ....... 340/200 |
| 4,030,347 | 6/1977 | Norris ................. 361/283 |
| 4,039,929 | 8/1977 | Weckenmann ....... 323/75 L |
| 4,092,579 | 5/1978 | Weit ................... 340/200 |

FOREIGN PATENT DOCUMENTS 1312241 4/1973 United Kingdom .

OTHER PUBLICATIONS

ISA Transactions, vol. 10, No. 3, Bloss, pp. 242-249.

Primary Examiner—James J. Groody
Attorney, Agent, or Firm—O'Rourke & Harris

[57] ABSTRACT

A displacement sensing device is disclosed having a capacitance transduction element which provides a linear transfer function with an output in a synchro-resolver form that is directly convertable to digital form. The transduction element includes four separate windings on each of the closely adjacent faces of a pair of coaxially positioned cylinders forming a rotor-stator assembly. Reference input voltages are coupled to specific predetermined windings on the stator to produce electrical outputs on the different windings on the rotor that are dependent upon the relative positioning of the stator and rotor, which outputs are coupled as charges through differential charge amplifiers to produce output voltage signals that are indicative of the relative positioning of the stator and rotor and are of a form determined by the applied reference voltages.

23 Claims, 7 Drawing Figures

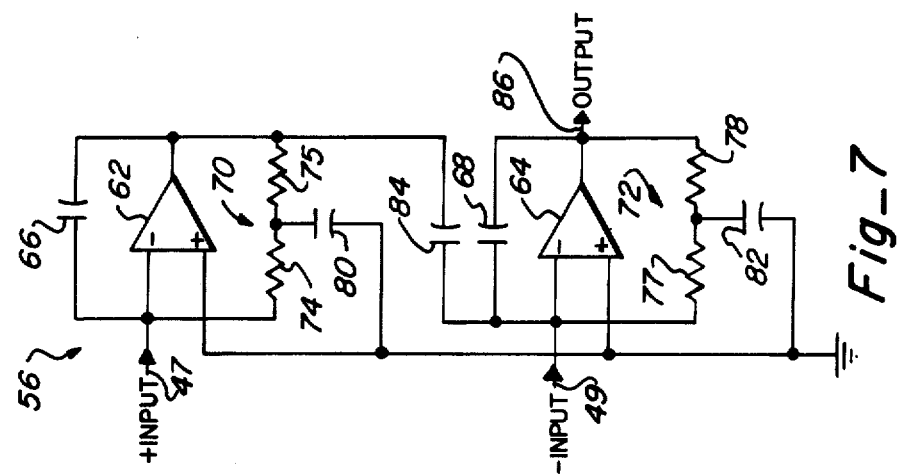
Fig_7
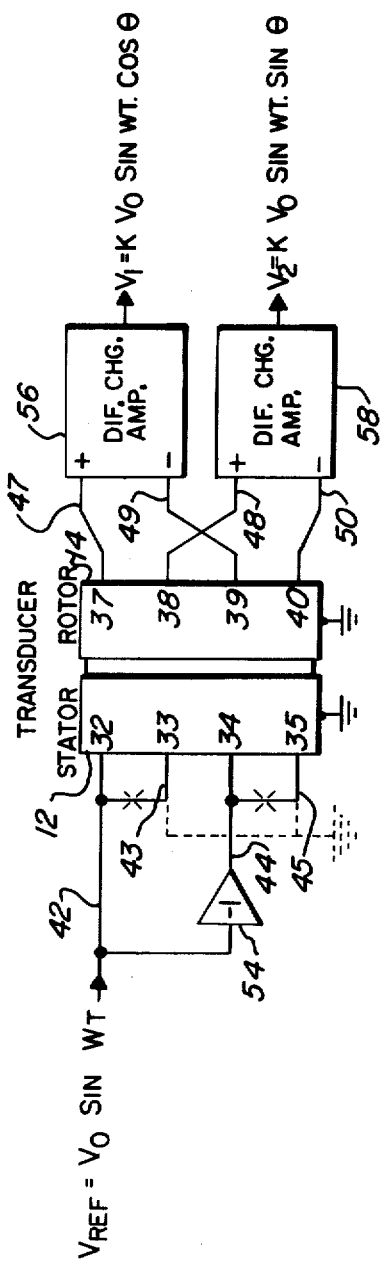
Fig_5
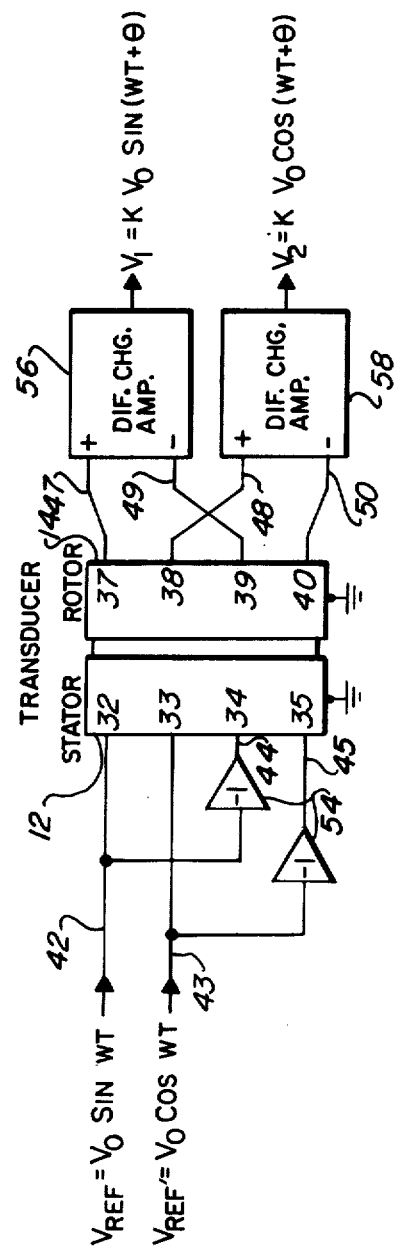
Fig_6

DISPLACEMENT SENSING DEVICE HAVING CAPACITANCE TRANSDUCTION ELEMENT

FIELD OF THE INVENTION

This invention relates to a displacement sensing device and, more particularly, relates to a linear displacement sensing device having a capacitance transduction element and an output in synchro resolver form.

BACKGROUND OF THE INVENTION

Electro-mechanical transducers for sensing displacement are well known and have been suggested and/or utilized in, or in conjunction with, a variety of devices.

Many of the physical parameters sought to be measured by electro-mechanical transducers such as, for example, acceleration, flow rate, force, liquid level, pressure, speed, strain, or torque, can be converted to displacement by mechanical means. Force, for example, may be measured by applying the force to a linear spring and measuring the deflection (i.e., displacement) of the spring.

There are a variety of principles that have heretofore been utilized to measure displacement in transducers. Among the better known of these are capacitive, electromagnetic, photoconductive, piezoelectric, potentiometric, resistive and strain gage. There are varieties of each and each has its own advantages and disadvantages.

Capacitance sensing techniques have come to the forefront in recent years, and particularly since the advent of operational and charge amplifiers which have made it possible to accurately sense capacitance changes between capacitance elements of less than $10^{-3}$ pf while disregarding relatively large stray capacitances to ground.

Air dielectric capacitance displacement sensing elements have been found to have some very distinct advantages over other sensing elements including other capacitance sensing elements. Among such advantages are the stability gained with respect to temperature and time, the resolution and dynamic range afforded, and functional variety offered.

With the exception of capacitance, the sensitivity utilizing the transduction principles, as above set forth, depends upon an electrical or a magnetic property of the material used in the sensing element. With respect to capacitance, however, the sensitivity is dependent only upon the mechanical arrangement of the capacitance plates. Because of this, capacitance sensing elements can be made which are very stable and which are able to operate over a wide temperature range.

Examples of capacitance tranducer devices may be found in U.S. Pat. Nos. 3,372,333; 3,566,221; 3,566,222; 3,570,003; 3,723,866; 3,928,796; and 3,961.318.

Since the transfer function of the capacitance sensing element is dependent only on the mechanical arrangement of the plates, a variety of functions may be obtained by diverse plate designs. For example, linear transducers may be made by varying the active area of either rectangular or cylindrical plates, an inverse function may be generated by varying the gap between plates, a linear output proportional to rotational angle may be provided by varying the area of the circular or cylindrical segments, and other functions, such as sine, cosine, and logarithmic, may be produced by varying the area of specially shaped plates.

A linear displacement capacitance transducer designed with a one inch range has been found to approach a microinch resolution (i.e., a dynamic range approaching $10^6$), and hence affords good resolution and extended dynamic range.

In general, however, capacitance sensing elements which operate on the principle of variation in gap between segments have high resolution but are non-linear, while those operating on the principle of area variation can be very linear but have poorer resolution.

For use as sensing elements in transducers, such elements should, however, have both a linear transfer function and high resolution, as well as high sensitivity, high stability, and be compatible with standard instrumentation commonly found in industry.

Most measurement situations require an output proportional to the measurand thus making the linear transfer function desirable. Transducers should cause as little disturbance as possible to the property being measured, this means, in most cases, very small deflections of the sensing element thus requiring high sensitivity.

Transducers must also operate over a wide range of environmental conditions and for long periods of time, thus requiring a highly stable sensing element for accurate measurement. In many transducer applications, it is desirable to measure both large and small values of the measurand with the same transducer and hence high resolution is required.

With the development of mini-computers and microprocessors for use in process control and data acquisition, a need has arisen for transducers with digital outputs. But syncro systems, on the other hand, have been developed for many years and their use has been well established in industry and recent developments in instrumentation have included utilization of synchro processing modules in a wide range of apparatus. This required development of synchro to digital circuitry which is able to handle a synchro signal in resolver form and convert the signal to digital form so that that such syncro resolvers can be used directly in digital systems by conventional synchro to digital converters.

SUMMARY OF THE INVENTION

This invention provides an improved displacement sensing element that includes a capacitance transduction element and provides output signals in synchro resolver form. A linear transfer function is provided, as is high sensitivity, stability, and resolution, with the output signal being directly convertable to digital form.

It is therefore an object of this invention to provide an improved displacement sensing device.

It is another object of this invention to provide an improved displacement sensing device having a capacitance transduction element.

It is still another object of this invemtion to provide an improved displacement sensing element that provides an output signal in synchro resolver form.

It is yet another object of this invention to provide an improved displacement sensing device that has high sensitivity, high stability, and high resolution with an output readily convertable to digital form.

It is yet another object of this invention to provide an improved displacement sensing device having a capacitance transduction element the output of which is coupled through differential charge amplifiers to produce output voltages indicative of sensed displacement.

It is still another object of this invention to provide an improved capacitance transduction element.

It is still another object of this invention to provide an improved capacitance transduction element having axially positioned cylinders with windings on adjacent faces providing a rotor-stator assembly.

With these and other objects in view, which will become apparent to one skilled in the art as the description proceeds, this invention resides in the novel construction, combination, and arrangement of parts substantially as hereinafter described and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised by the practical application of the principles thereof, and in which:

FIG. 5 is a block diagram illustrating one arrangement of applied reference input voltages and the resulting outputs for the sensing device shown in FIGS. 1 through 4;

FIG. 6 is a block diagram illustrating a second arrangement of applied reference input voltages and the resulting output voltages for the sensing device as shown in FIGS. 1 through 4; and FIG. 7 is an electrical schematic of a differential charge amplifier as shown in block form in FIGS. 5 and 6.

DESCRIPTION OF THE INVENTION

Figure 1:
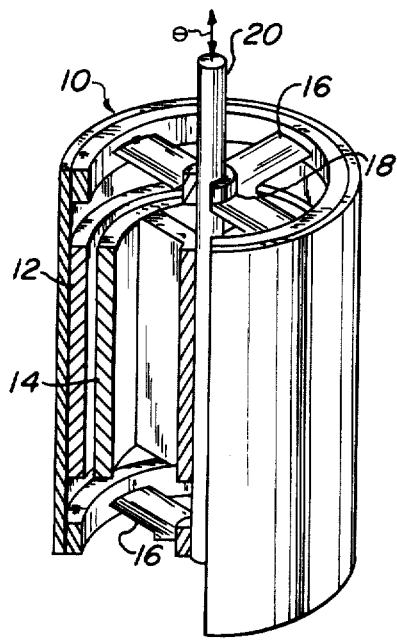
FIG. 1 is a perspective view of the displacement sensing device of this invention.

Referring now to the drawings, the displacement sensing device 10 of this invention is shown in FIG. 1 to include an outer cylinder, or stator, 12 and an inner cylinder, or rotor, 14 that is coaxially positioned with respect to outer cylinder 12.

The cylinders 12 and 14 may be maintained coaxially positioned with respect to one another in any conventional manner, and thus may include, by way of example, flexures 16 fixed to the outer cylinder 12 and extending inwardly therefrom to hub 18 fastened to central shaft 20 which shaft has inner cylinder 14 fixed thereto. The cylinders 12 and 14 are relatively movable with respect to one another in opposite axial directions, due to the flexures 16 but are constrained against relative angular movement with respect to one another.

The stator and rotor cylinders are mechanically connected to a device having a displacable element, the movement of which is to be measured, to cause relative movement between the stator and rotor. Examples of such devices are set out herein. Stator 12 may also be connected with one side of a conventional transducer sensing element while the rotor 14 may be connected to the other side so that the application of the measurand causes relative axial displacement between the stator and rotor.

Figure 3:
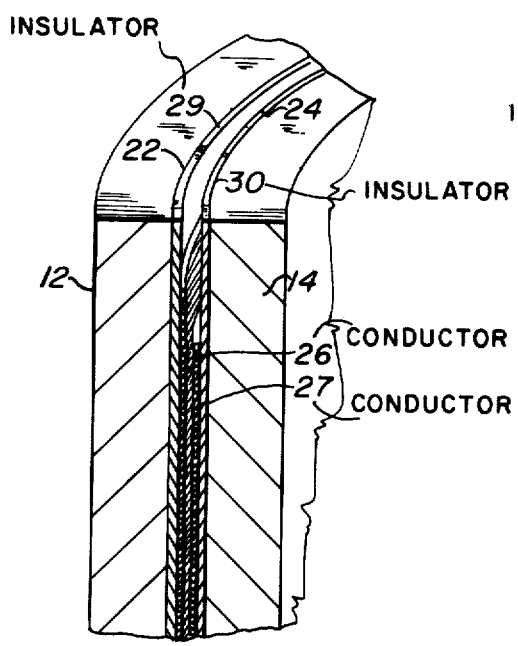
FIG. 3 is a partial cross-sectional view of the stator and rotor cylinders as shown in FIG. 1 and illustrating the insulated layers and conductors on adjacent faces thereof.
Figure 4:
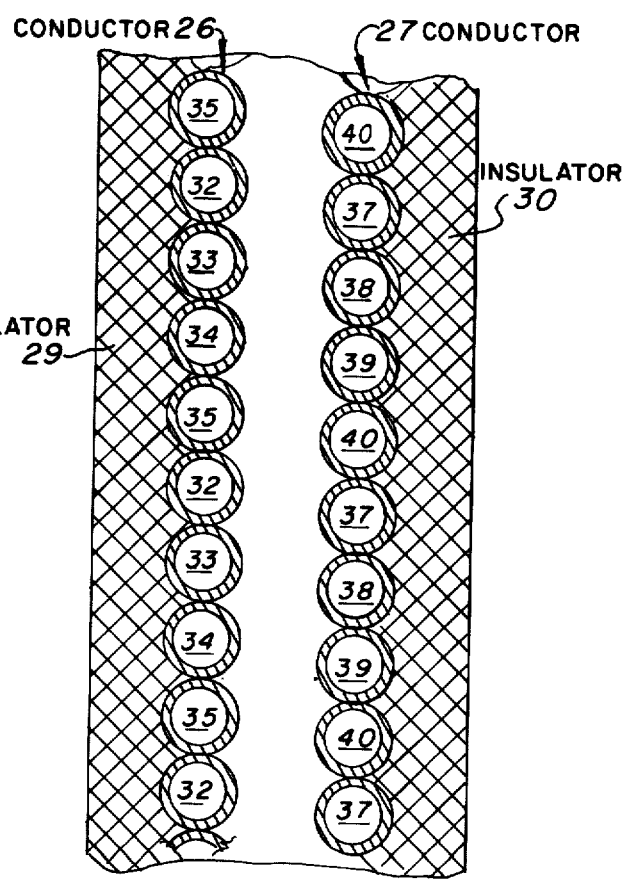
FIG. 4 is an enlarged partial view of elements as shown in FIG. 3 to illustrate the positioning of the conductors on the stator and rotor.

As shown best in FIGS. 3 and 4, the adjacent faces 22 and 24 (i.e., the inner cylindrical surface of metallic stator 12 and the outer cylindrical surface of metallic rotor 14) have capacitance elements 26 and 27, respectively, thereon with the windings on the stator and rotor having an air spacing therebetween. Elements 26 and 27 are metallic conductors and may be wound, bonded to, or printed on, an insulating layer 29 and 30, respectively, on faces 22 and 24 of the stator and rotor which cylinders are grounded. The conductors, or windings, 26 on the stator extend beyond the windings 27 on the rotor at both ends to facilitate displacement measurements, and the pitch, or spiral path of the windings in each case is carefully controlled to be uniform with the pitch of the windings on the rotor being identical to the pitch of the windings on the stator.

As shown in FIG. 4, element 26 includes four separate metallic conductors 32, 33, 34, and 35 repeatedly wound side by side on the inner face of the stator with the conductors being each insulated from one another and from the cylinder 12. In like manner, element 27 includes four separate metallic conductors 37, 38, 39 and 40 repeatedly wound side by side on the outer face of the rotor with the conductors also being each insulated from one another and from the cylinder 14. As can be readily seen from FIG. 4, the spiral path of each conductor is therefore four times the space required by the conductor (i.e., substantially the diameter of the conductor) with each conductor being insulated from each adjacent conductor, preferably by an insulating coating on the conductor, and from the associated cylinder due to the insulating layer 29 or 30 on the associated cylinder.

Leads 42, 43, 44, and 45 are electrically connected to conductors 32, 33, 34, and 35, respectively, and leads 47, 48, 49, and 50 are electrically connected to conductors 37, 38, 39, and 40, respectively, with all of the leads being taken from one end of the cylinders for attachment to external elements, such as indicated in FIGS. 5 and 6 which are illustrative of the principle of operation of the device.

Figure 2:
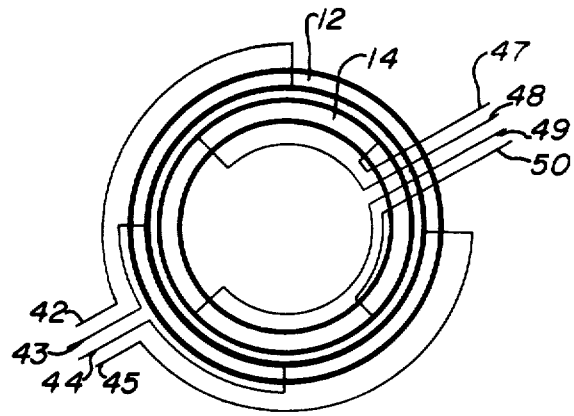
FIG. 2 is a top view of the displacement sensing device shown in FIG. 1 but without the support elements connected therewith.

As shown in FIG. 2, each lead (42-45) for each stator winding (32-35) is coupled from the cylinders at a 90° angle with respect to each adjacent stator-connected lead. In like manner, each lead (47-50) for each rotor winding (37-40) is coupled from the cylinders at a 90° angle with respect to each adjacent rotor-connected lead with the rotor-connected leads being angularly spaced (about 45°) from each adjacent stator-connected lead. This has been found necessary, at least in some instances, for proper coupling to be achieved.

As shown in FIG. 5, a reference voltage ($V_{ref}$) of the form:

$$V_{ref} = V_o \sin \omega t$$

may be applied through leads 42 and 43 to conductors 32 and 33, while a negative reference voltage ($-V_{ref}$) may be applied through leads 44 and 45 and linear inverting amplifier 54 to conductors 34 and 35.

Conductors 37 and 39 are coupled through leads 47 and 49, respectively, to differential charge amplifier 56, while conductors 38 and 40 are coupled through leads 48 and 50, respectively, to differential charge amplifier 58, which amplifiers are selected with a pass band which does not distort the amplitude or phase of the various signals.

Differential charge amplifiers 56 and 58 may be identical, and differential charge amplifier 56 is shown in electrical schematic form in FIG. 7. As indicated in FIG. 5, lead 47 from rotor 14 is connected to the positive input of amplifier 56, while lead 49 is connected to the negative input of the differential charge amplifier 56.

As shown in FIG. 7, lead 47 is connected to the inverting input of operational amplifier 62, while lead 49 is connected to the inverting input of operational amplifier 64. Both operational amplifiers 62 and 64 have their non-inverting inputs connected to ground, and both have feedback capacitors (66 and 68, respectively,) connected from the output to the inverting input, and both have a DC feedback path (70 and 72, respectively) which includes a pair of resistors (74–75 and 77–78, respectively) connected in series across the feedback capacitors with the junction of each pair of resistors also having a bypass capacitor (80 and 82, respectively) to ground thereat. In addition, the output of operational amplifier 62 is connected with the inverting input of operational amplifier 64 through capacitor 84, which capacitor is equal in value to capacitor 66.

When a charge is coupled from the rotor 14 through lead 47 to operational amplifier 62, then operational amplifier 62 produces an output voltage which maintains lead 47 at ground potential by inducing an equal but opposite charge through feedback capacitor 66. The same opposite charge is induced by capacitor 84 into lead 49 where it is summed with a charge coupled from the rotor through lead 49 to operational amplifier 64 so that operational amplifier 64 produces an output voltage which maintains lead 49 at ground potential by inducing an equal but opposite charge through feedback capacitor 68. The output voltage of operation amplifier 64, which is coupled to lead 86, is, therefore, proportional to the difference in the charges coupled from the rotor 14 through leads 47 and 49.

The operation of the transduction element can be explained with particular reference to FIGS. 4 and 5. For purposes of establishing a displacement reference ($\theta = 0$). Conductors 37 through 40 are positioned with respect to conductors 32 through 35 in such a way that conductor 37 is equidistant between conductors 32 and 33, conductor 38 is equidistant between conductors 33 and 34, conductor 39 is equidistant between conductors 34 and 35, and conductor 40 is equidistant between conductors 35 and 32, a reference voltage $V_{ref} = V_o$ SIN wt is then applied directly to conductors 32 and 33 through leads 42 and 43, respectively, and to conductors 34 and 35 through inverter 54 and leads 44 and 45, respectively. Due to the capacitive coupling then existing between the conductors of the stator and those of the rotor a net charge is induced on conductor 37 that is in phase with the reference voltage, while an equal charge that is 180° out of phase is induced on conductor 39. Differential charge amplifier 56, connected to conductors 37 and 39 through leads 47 and 49, senses the induced charge and produces an output voltage:

$$V_1 = K\, V_o \text{ SIN wt} \qquad \theta = 0$$

Since conductors 38 and 40 are equidistant from the set of conductors 32 and 33, and the set of conductors 34 and 35, a net charge of zero is induced on conductors 38 and 40 which are connected through leads 48 and 50 to differential charge amplifier 58. Hence, $$V_2 = 0 \qquad \theta = 0$$

If the rotor is now shifted upward by one conductor spacing ($\theta = 90°$), conductor 38 on the rotor is between conductors 32 and 33, on the stator, conductor 39 is between conductors 33 and 34, conductor 40 is between conductors 34 and 35, and conductor 37 is between conductors 35 and 32. In this relative positioning of stator and rotor, the output voltages are:

$$V_1 = 0 \qquad \theta = 90°$$
$$V_2 = K\, V_o \text{ SIN wt}$$

The output voltages at ninety degree intervals are:

$$V_1 = -K\, V_o \text{ SIN wt}$$
$$V_2 = 0 \qquad \theta = 180°$$
$$V_1 = 0$$
$$V_2 = -K\, V_o \text{ SIN wt} \qquad \theta = 270°$$
$$V_1 = K\, V_o \text{ SIN wt}$$
$$V_2 = 0 \qquad \theta = 360°$$

These voltages are exact. The output voltages can be approximated at any position, however, by:

$$V_1 \approx KV_o \text{ SIN wt COS } \theta$$

$$V_2 \approx KV_o \text{ SIN wt SIN } \theta$$

The accuracy of this approximation depends upon a number of parameters such as the shape of the conductors, the shape of the insulation, the radial separation between the stator and rotor windings, and the uniformity of the windings. Experiments, however, have shown that it is not difficult to produce windings, the outputs of which define the displacement $\theta$ within 0.01% of full range. Thus, $$V_1 = KV_o \text{ SIN wt COS } \theta$$

$$V_2 = KV_o \text{ SIN wt SIN } \theta$$

within the limit of accuracy.

These output voltages are in standard synchro-resolver form, and the amplitude of the carrier output signals varies as the sine and cosine of the displacement $\theta$.

As indicated by the dotted line in FIG. 5, a reference displacement could also be established by aligning conductors 32–35 and 37–40 and grounding leads 43 and 45.

The displacement sensing device of this invention can be used to produce another form of output signals in which the phase of the output signal relative to the reference voltage is proportional to the displacement $\theta$. FIG. 6 indicates the necessary connections for this form of output. In this case, the stator elements are driven by voltages which are in quadrature as indicated in FIG. 6. The output voltages then are:

$$V_1 = KV_o \text{ SIN (wt} + \theta)$$

$$V_2 = KV_o \text{ COS (wt} + \theta)$$

In this case the same approximations apply as are set forth in connection with the arrangement as shown in FIG. 5.

From the foregoing, it can be appreciated that this invention provides an improved displacement measuring device having a capacitance transduction element with voltage outputs being provided in synchro-resolver form through use of differential charge amplifiers connected with said capacitance transduction element.

What is claimed is:

1. A linear displacement sensing device, comprising:
a capacitance transduction element having relatively movable elongated portions capable of being adjacent to one another with each of said elongated portions having a substantially uniform surface area, and with one of said portions being connectable with a unit having one member displaceable with respect to another member to sense the displacement of said one member with respect to said another member;
input means for providing an input reference voltage to said capacitance transduction element; and
output means connected with said capacitance transduction element to receive charges therefrom and responsive thereto providing output voltages in snychro-resolver form to indicate the displacement of said one member with respect to said another member.

2. The device of claim 1 wherein said elongated portions of said capacitance transduction element includes inner and outer coaxially positioned cylinders, one of which is a stator and the other of which is a rotor with said cylinders being relatively movable with respect to one another in opposite axial directions.

3. The device of claim 2 wherein said inner cylinder has a plurality of conductors on the outer surface thereof and said outer cylinder has a plurality of conductors on the inner surface thereof, said conductors being adjacent to but electrically insulated from one another.

4. The device of claim 3 wherein said conductors are positioned side by side with respect to one another and extend as a spiral along each surface of each of said cylinders.

5. The device of claim 4 wherein said plurality of conductors includes four conductors positioned side by side whereby each conductor is spaced along said cylindrical surface a distance substantially equal to four times the diameter of said conductor.

6. The device of claim 1 wherein said input means includes means for providing an input reference voltage of $V_o$ SIN wt.

7. The device of claim 6 wherein said input means includes means for providing a second input reference voltage of $-V_o$ COS wt.

8. The device of claim 1 wherein said output means includes differential charge amplifier means connected with said capacitance transduction element to receive charges therefrom and supply output voltages in response thereto.

9. The device of claim 8 wherein said differential charge amplifier means includes a pair of differential charge amplifiers, and wherein said device includes a first pair of conductors connecting said capacitance transduction element with one of said differential charge amplifiers and a second pair of conductors connecting said capacitance transduction element with the other said differential charge amplifiers.

10. The device of claim 9 wherein each of said differential charge amplifiers includes a pair of interconnected operational amplifiers having feedback capacitance means.

11. The device of claim 9 wherein said conductors are coupled from said capacitance transduction element at an angular spacing of substantially 90° with respect to one another.

12. The device of claim 11 wherein said input means includes a plurality of input conductors with said input conductors being spaced from said conductors coupling said charges from said capacitance transduction element to said differential charge amplifiers.

13. The device of claim 9 wherein said output voltages supplied by said output means includes a first voltage output of $V_1 = KV_o$ SIN wt COS $\theta$ and a second voltage output of $V_2 = KV_o$ SIN wt SIN $\theta$ when an input reference voltage of $V_o$ SIN wt is coupled to said input means.

14. The device of claim 9 wherein said output voltages supplied by said output means includes a first voltage output of $V_1 = KV_o$ SIN (wt + $\theta$) and a second voltage output of $V_2 = KV_o$ COS (wt + $\theta$) when input reference voltages of $V_o$ SIN wt and $V_o$ COS wt are coupled to said input means.

15. A linear displacement sensing device, comprising:
a capacitance transduction element having first and second relatively movable portions with said first portion being operatively connectable with one member of a unit and said second relatively movable portion being operatively connectable with another member of said unit that is linear displaceable with respect to said one member so that said element senses the linear displacement of said another member with respect to said one member;
input means for receiving a predetermined input reference voltage and inverting the same and coupling said reference voltage and said inverted reference voltage to one of said relatively movable portions of said capacitance transduction elements;
output means connected with the other of said relatively movable portions of said capacitance transduction element and coupling charges therefrom when said input reference voltage is coupled to said input means, said charges being dependent upon the relative positioning of said portions of said capacitance transduction element; and
differential charge amplifier means connected with said output means to receive said charges therefrom and responsive thereto providing output voltages in synchro-resolver form to accurately indicate said relative positioning of said portions of said capacitance transduction element.

16. The device of claim 15 wherein said relatively moveable portions of said capacitance transduction element are coaxially positioned cylinders axially moveable with respect to one another to indicate displacement of said another member of said unit with respect to said one member.

17. The device of claim 16 wherein each of said cylinders has a plurality of four conductors wound thereon with said conductors on one cylinder being closely adjacent to those on said other cylinder, wherein said input means includes at least a pair of conductors connected with different ones of said conductors on one of said cylinders, wherein said output means includes four conductors, and wherein said differential charge amplifier means includes a pair of differential charge amplifiers each of which is connected with different pairs of conductors of said output means.

18. A capacitance transduction element for a linear displacement sensing device, said element comprising:
- a first cylinder having an insulating layer on the outer surface thereof;
- a first plurality of four substantially uniform conductors spirally wound side by side on said insulating layer of said cylinder;
- a second cylinder surrounding said first cylinder and coaxially positioned with respect thereto, said first and second cylinders being relatively movable in opposite axial directions with respect to one another, and said second cylinder having an insulating layer on the inner surface thereof;
- a second plurality of four substantially uniform conductors spirally wound side by side on said insulating layer of said second cylinder, the pitch of said spiral windings of said first and second plurality of conductors being substantially idential;
- an input lead for receiving a predetermined reference input voltage and coupling the same to at least one of said conductors of said second plurality of conductors at one end of said second cylinder;
- inverting means connected to said input lead for inverting said input reference voltage and coupling the same to at least a different one of said conductors of said second plurality of conductors at said one end of said second cylinder; and
- a plurality of four output leads connected at said one end of said first cylinder with different ones of first plurality of four conductors, said four output leads being angularly spaced substantially 90 degrees with respect to one another and coupling charges from said element when an input reference voltage is received by said input lead, said charges being accurately indicative of the relative linear positioning of said first and second cylinders with respect to one another.

19. The element of claim 18 wherein said element includes a pair of differential charge amplifiers each of which is connected to receive different ones of said four output leads and provides output voltages in synchro-resolver form in response to receiving of charges from said four conductors connected with said four output leads.

20. A linear displacement sensing device, comprising:
- a capacitance transduction element having a pair of portions connectable with first and second members of a unit, said first member being linearly displaceable with respect to said second member whereby the displacement of said first member can be sensed with respect to said second member;
- input means for providing an input reference voltage of $V_o \sin wt$ to one of said portions of said capacitance transduction element; and
- output means including a pair of charge amplifiers connected with the other of said portions of said capacitance transduction element to receive charges therefrom and responsive thereto providing a first voltage output of $KV_o \sin wt \cos \theta$ and a second voltage output of $KV_o \sin wt \sin \theta$, which voltages accurately indicate, in synchro-resolver form, said linear displacement of said first member relative to said second member.

21. The device of claim 20 wherein at least said one portion of said capacitance transduction element includes a plurality of conductors, and wherein said input means includes input lead means connected with at least one conductor of said plurality of conductors to couple said input reference voltage thereto and inverting means connected with said input lead means and at least another of said conductors of said plurality of conductors to invert said input reference voltage and couple the same to said another of said conductors.

22. The device of claim 20 wherein the other of said portions of said capacitance transduction element includes a plurality of conductors, and wherein said pair of charge amplifiers includes a pair of differential charge amplifiers connected with different ones of said plurality of conductors of said other portion of said capacitance transduction element.

23. The device of claim 20 wherein said portions of said capacitance transduction element each includes four separate conductors, wherein two of said conductors of said one portion are connected to receive said input reference voltage and the other two of said conductors of said one portion are connected to receive said input reference voltage inverted, wherein each of said charge amplifiers includes a pair of inputs, and wherein two of said conductors of said other portion of said capacitance transduction element are connected to different ones of said inputs of one of said charge amplifiers with the other two of said conductors of said other portion being connected to different ones of said inputs of the other of said charge amplifiers.

* * * * *